(12) United States Patent
Suzuki

(10) Patent No.: US 6,594,164 B2
(45) Date of Patent: Jul. 15, 2003

(54) PWM CONTROLLED POWER CONVERSION DEVICE

(75) Inventor: Kentaro Suzuki, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/790,724

(22) Filed: Feb. 23, 2001

(65) Prior Publication Data

US 2001/0022736 A1 Sep. 20, 2001

(30) Foreign Application Priority Data

Feb. 25, 2000 (JP) .......................... 2000-048792
Aug. 29, 2000 (JP) .......................... 2000-259301

(51) Int. Cl.$^7$ .............................................. H02M 7/00
(52) U.S. Cl. ................. 363/69; 363/44; 363/87; 363/89; 363/129
(58) Field of Search .................... 363/65, 67, 69, 363/70, 44–48, 85, 87, 89, 125, 128, 129

(56) References Cited

U.S. PATENT DOCUMENTS 4,630,188 A * 12/1986 Daggett ...................... 363/129
5,483,142 A * 1/1996 Skibinski et al. ............ 320/166
5,504,667 A * 4/1996 Tanaka et al. ................. 363/37
5,886,888 A * 3/1999 Akamatsu et al. ............ 363/65
5,946,205 A * 8/1999 Kawakami et al. ........... 307/82
6,038,152 A * 3/2000 Baker .......................... 363/126

* cited by examiner

Primary Examiner—Gregory J. Toatley, Jr.
Assistant Examiner—Gary L. Laxton
(74) Attorney, Agent, or Firm—Foley & Lardner

(57) ABSTRACT

A power conversion device according to the invention of the present application includes: an active current controller that calculates a phase angle reference value for determining the ON/OFF phase with reference to the AC power source voltage phase, from the deviation of the input active current with respect to an active current reference value; and a fixed pulse pattern generator that controls the self-excited voltage type power converter by generating switching signals of fixed pulse pattern whose fundamental frequency is synchronized with the AC power source frequency, based on the phase angle reference value calculated by this active current controller.

In this way, with the invention of the present application, the harmonic components contained in the AC input current can be reduced without raising the switching frequency of the PWM power conversion device.

14 Claims, 15 Drawing Sheets

PWM CONTROLLED POWER CONVERSION DEVICE

BACKGROUND OF THE INVENTION

1. Field of the Invention

The present invention relates to a power conversion device that converts AC power and DC power, and more particularly relates to a PWM controlled power conversion device wherein the harmonic components contained in the AC input current waveform are decreased and the efficiency of power conversion is improved.

2. Description of the Related Art

A power conversion device that converts AC power to DC power is the PWM controlled AC/DC power conversion device described in Laid-open Japanese Patent Publication No. H. 10-66343.

The essentials thereof are shown in FIG. 1, numeral 1 being an AC power source, numeral 3 being a self-excited voltage converter, numeral 4-1 and 4-2 being smoothing capacitors, numeral 5 being the load; and numeral 10 being a PWM controller. Self-excited voltage converter 3 is an NPC (neutral point clamped) circuit.

Typically in a PWM controlled AC/DC power conversion device, sine-wave PWM control is performed based on triangular wave comparison; however, by setting the modulation frequency (triangular wave carrier frequency) of PWM control higher than the AC power source frequency, the harmonic components contained in the input current waveform on the AC power source side can be reduced.

FIG. 2 shows an example of the waveform of such operation, and shows the sine-wave signal SIN, triangular wave carrier signals TR1, TR2, the switching signals Gu1, Gu2, Gx1, Gx2 that are applied to the U-phase switching devices Su1, Su2, Sx1, Sx2 of the self-excited voltage converter, and the AC-side U-phase voltage waveform Vsu of the converter. The voltage of the smoothing capacitor is here taken to be Vd.

In a power conversion device (AC/DC power conversion device) in which AC power is converted to DC power, if a large amount of harmonic components are contained in the input current waveform on the AC power source side, this is a factor causing distortion of the AC system voltage and may have an adverse effect on other electrical equipment connected to the same AC system. An AC/DC power conversion device in which there are few power source harmonics is therefore sought.

PWM control is performed in the AC/DC power conversion device shown in FIG. 1, but in general in AC/DC power conversion equipment of the PWM controlled type, the modulation frequency of PWM control must be raised in order to reduce the amount of harmonic components contained in the AC input current waveform.

It is therefore an unavoidable requirement to raise the switching frequency of the switching devices; however, there is an upper limit to the switching frequency, depending on the characteristic of the elements of the switching element. In particular, sufficient harmonic reduction effect was sometimes not obtained at the upper limiting frequency of the GTO thyristor elements that are commonly used in high-capacity power conversion devices. Furthermore, raising the switching frequency tended to increase switching losses generated in the switching element and was associated with a drop in the power conversion efficiency of the power conversion device.

Accordingly, an object of the invention of the present application is to provide a power conversion device capable of achieving both improved power conversion efficiency and a reduction in the amount of harmonics of the power source, by realizing a system in which the harmonic components contained in the AC input current waveform can be reduced without raising the switching frequency of the AC/DC power conversion device.

SUMMARY OF THE INVENTION

Accordingly, one object of the present invention is to provide a novel power conversion device comprising:

an active current control means (unit) that calculates a phase angle reference value for determining the ON/OFF phase based on the AC power source voltage phase from the deviation with respect to the active current reference value of the active current that is input to the power conversion device; and a fixed pulse pattern generating means (unit) that controls the self-excited voltage power conversion device by generating a switching signal of fixed pulse pattern whose fundamental frequency is synchronized with the AC power source frequency, based on the phase angle reference value calculated by this active current control means (unit).

According to the invention of the present application, even if, for the fixed pulse pattern, a pulse pattern of the switching signal supplied to the self-excited voltage type power conversion device is selected such as to produce a desired value of the harmonic components, it becomes possible to control the active current supplied to the power conversion device from the AC power source to a desired value, thereby making it possible to reduce the harmonic components contained in the AC input current waveform without raising the switching frequency of the switching devices.

Further, in order to achieve the above object, according to the invention of the present application, there are provided:

n transformers whose primaries are connected in series with the AC voltage source and that shift the phase of the secondary voltage by 60°/n in each case; and self-excited voltage converters whose AC sides are connected to the respective secondary sides of these transformers; and a pulse pattern generator that produces pulse patterns wherein the phase of the switching signal that is applied to these respective self-excited voltage converters is shifted in each case by 60°/n but is otherwise the same.

With the present application, the amount of harmonic components contained in the AC input current waveform can therefore be reduced, thanks to the series multi-connection effect at the AC input terminal of the self-excited voltage converters without raising the switching frequency of the switching devices.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
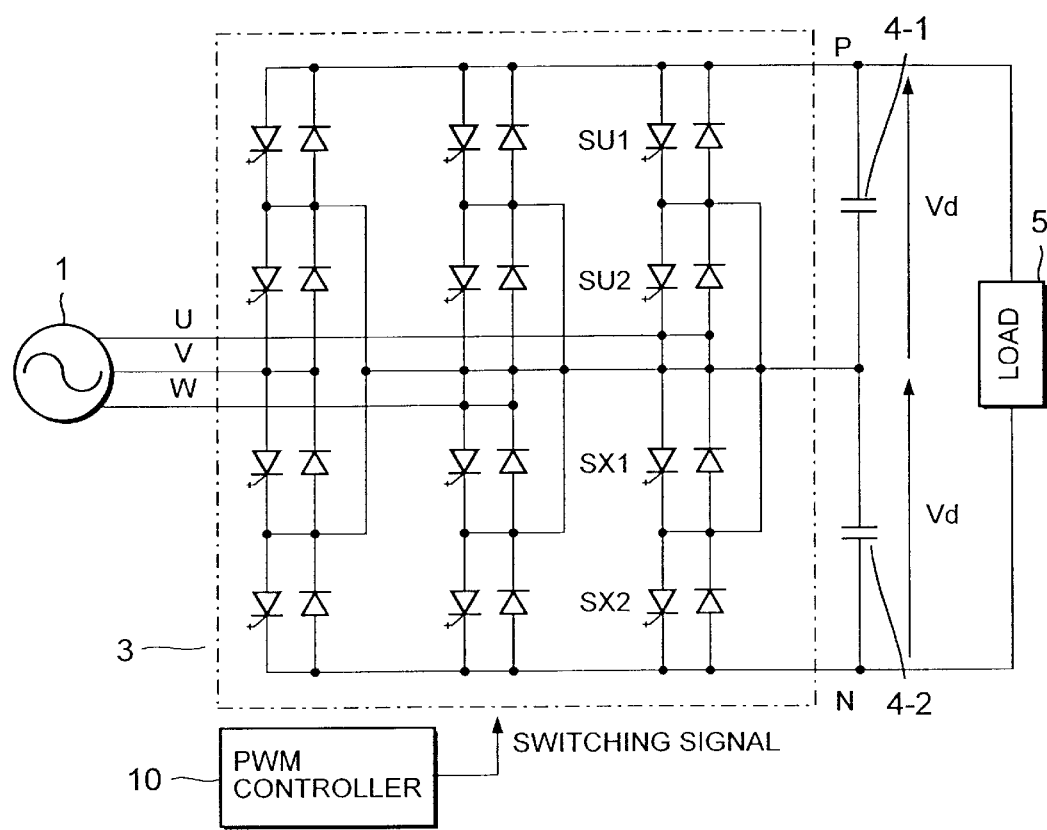
FIG. 1 is a layout diagram illustrating a prior art power conversion device.
Figure 2:
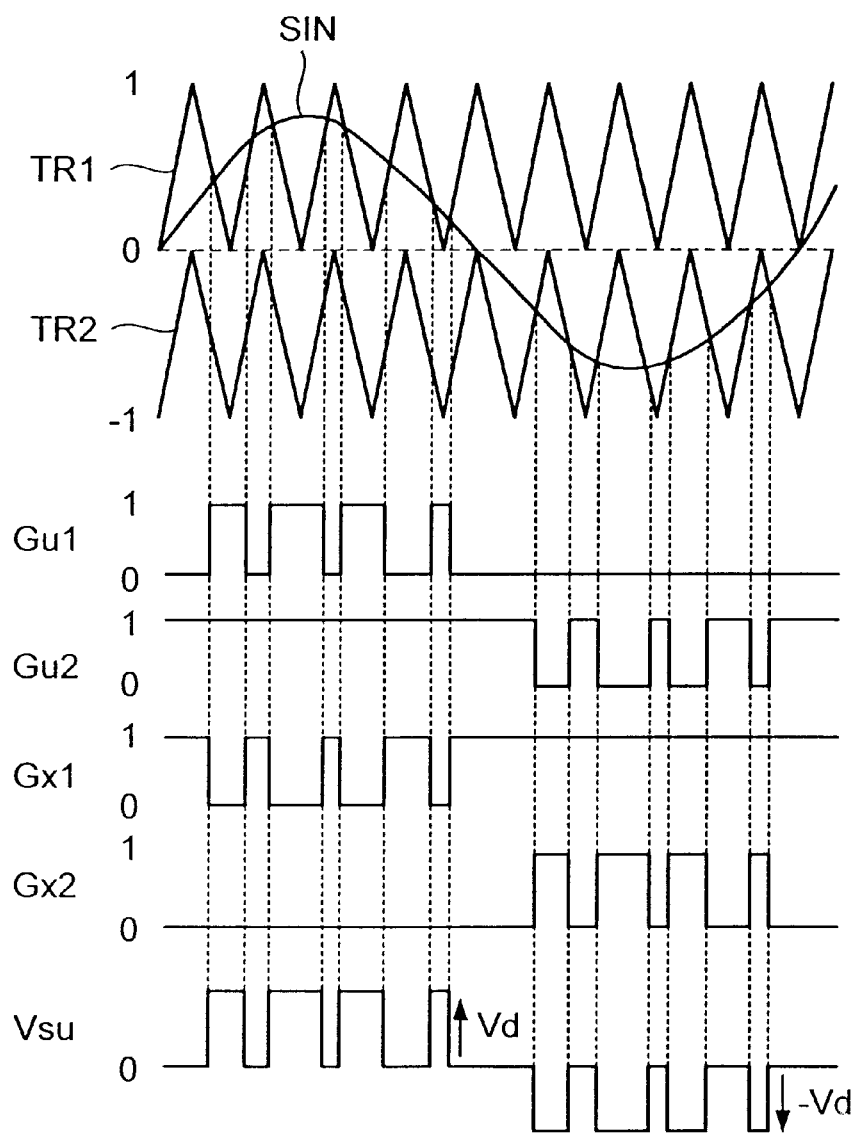
FIG. 2 is a waveform diagram given in explanation of the principles of operation of the prior art power conversion device illustrated in FIG. 1.

Referring now to the drawings, wherein like reference numerals designate identical or corresponding parts throughout the several views, and more particularly to FIG. 3 thereof, one embodiment of the present invention will be described.

Identical structural elements are given the same reference symbols and further description thereof is omitted.

First Embodiment

Figure 3:
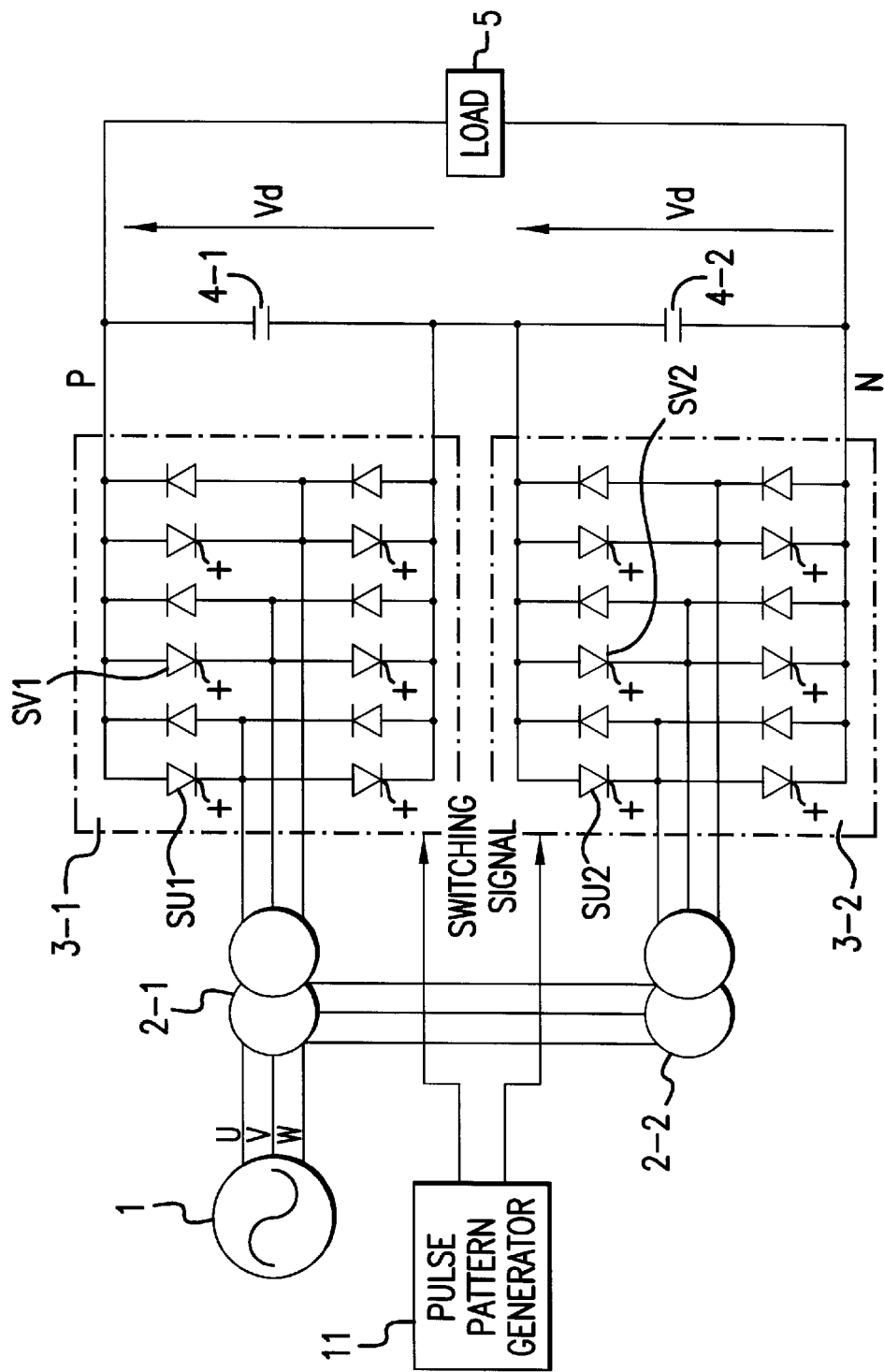
FIG. 3 is a layout diagram illustrating a first embodiment of the present invention.

FIG. 3 is a layout diagram of a power conversion device according to this embodiment. In this case, as an example, the multi-connection number is taken as n=2.

In FIG. 3, numeral 1 is an AC power source, numeral 2-1 and 2-2 are transformers, numeral 3-1 and 3-2 are self-excited voltage converters, numeral 4-1 and 4-2 are smoothing capacitors, numeral 5 is the load, and numeral 11 is a pulse pattern generator.

Transformers 2-1 and 2-2 have their primary sides connected in series with the AC power source 1; the phase of the secondary voltage of 2-1 is advanced by 30° with respect to that of 2-2. The AC terminals of the self-excited voltage converters 3-1 and 3-2 are respectively connected to the secondary side of transformers 2-1 and 2-2.

Smoothing capacitors 4-1 and 4-2 are respectively connected to the DC side terminals of self-excited voltage converters 3-1 and 3-2 and are mutually connected in series, the two ends thereof being connected to DC buses P and N. Load 5 is connected between the DC buses P and N and may be for example a voltage inverter.

Pulse pattern generator 11 generates the pattern of the switching signals that are supplied to the self-excited voltage converters. The pulse patterns that are supplied to self-excited voltage converters 3-1 and 3-2 are of identical pattern, but the phase of the pulse pattern supplied to self-excited voltage converter 3-1 is advanced by 30° from that supplied to self-excited voltage converter 3-2.

Figure 4:
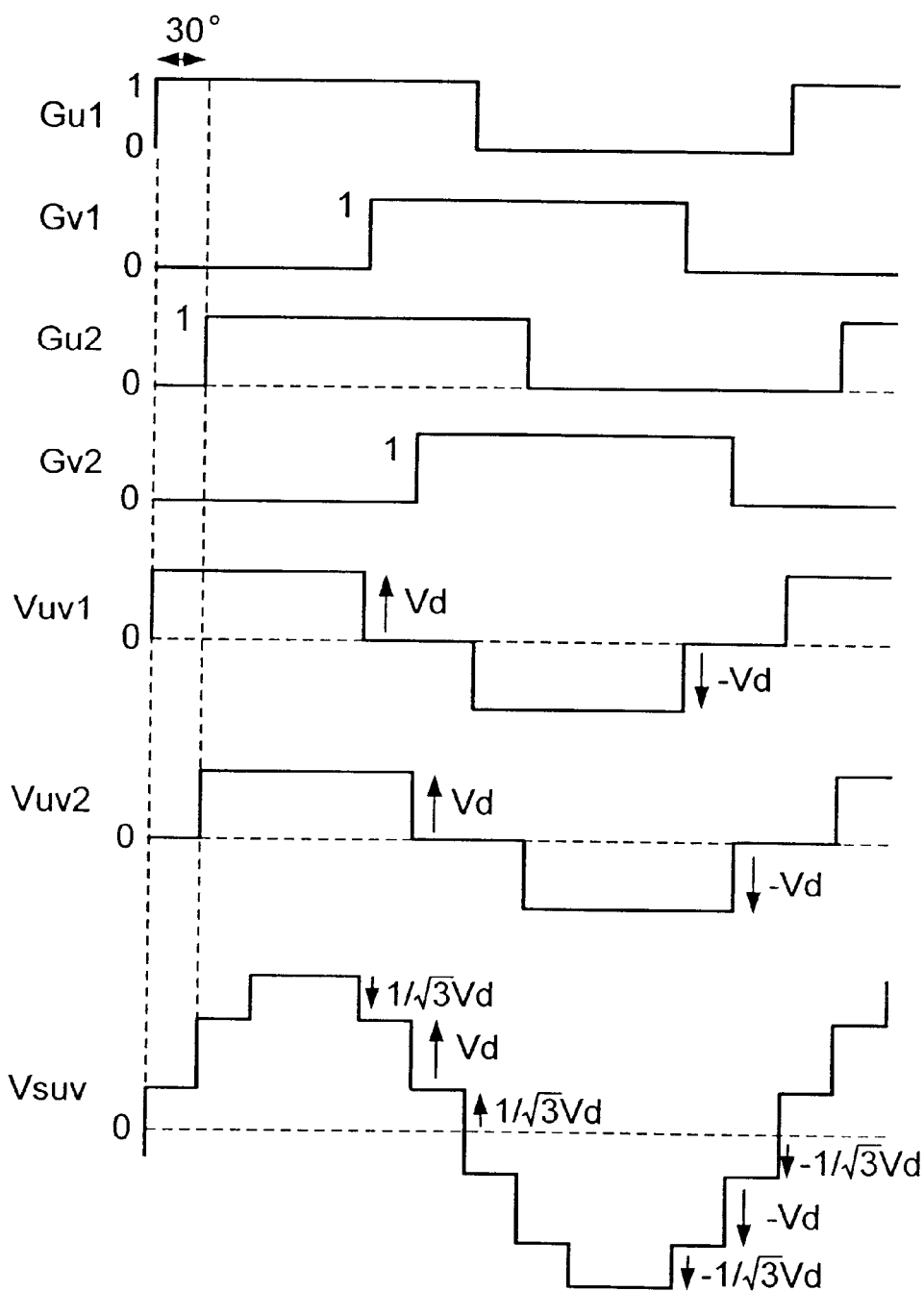
FIG. 4 is a waveform diagram given in explanation of the principles of operation of the first embodiment of the present invention illustrated in FIG. 3.

FIG. 4 shows an example of the switching signals Gu1, Gv1, Gu2, and Gv2 supplied to switching devices Su1, Sv1, Su2, Sv2 of the U-phase and V-phase of the self-excited voltage converters, the voltage waveforms Vuv1, and Vuv2 between the secondary wirings of the transformers and the voltage waveform Vsuv across the primary wiring of the transformers at the AC power source connection point.

The voltage of the smoothing capacitor is here taken to be Vd.

From FIG. 4, it can be seen that, even if the switching frequency is made the same as the AC power source frequency, the voltage waveform Vsuv across the AC wiring of the power conversion device is sine-wave shaped. The harmonic components contained in the AC input current waveform are determined by the harmonic components contained in the converter AC voltage Vsuv, so if the converter AC voltage Vsuv is sine-wave shaped, the AC input current waveform is also sine-wave shaped, and the harmonic content can be reduced.

Consequently, with this embodiment, the harmonic components contained in the AC input current waveform can be reduced without raising the switching frequency.

Second Embodiment

Figure 5:
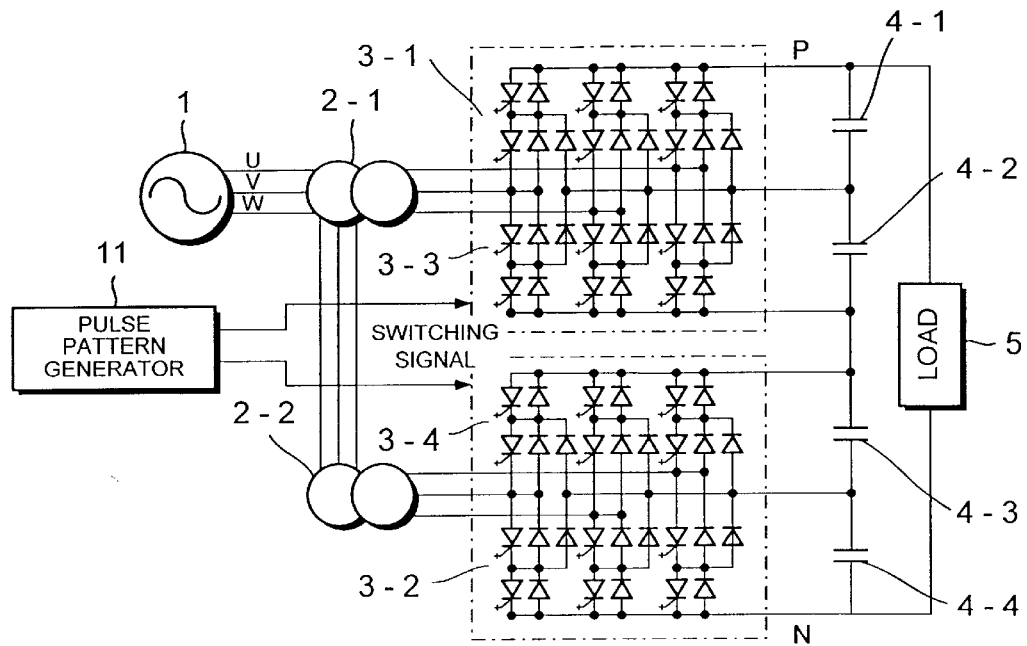
FIG. 5 is a layout diagram illustrating a second embodiment of the present invention.

A second embodiment of the present invention is described below with reference to the drawings. As shown in FIG. 5, this embodiment differs from the first embodiment in that the self-excited voltage converters 3-3 and 3-4 are NPC (neutral point clamped) circuits.

So long as the multi-connected converters are self-excited voltage converters as in this embodiment, there is no particular restriction as to their type.

Third Embodiment

A third embodiment of the present invention is described below with reference to the drawings. In this embodiment, as an example, the multi-connection number is taken as n=2.

Figure 6:
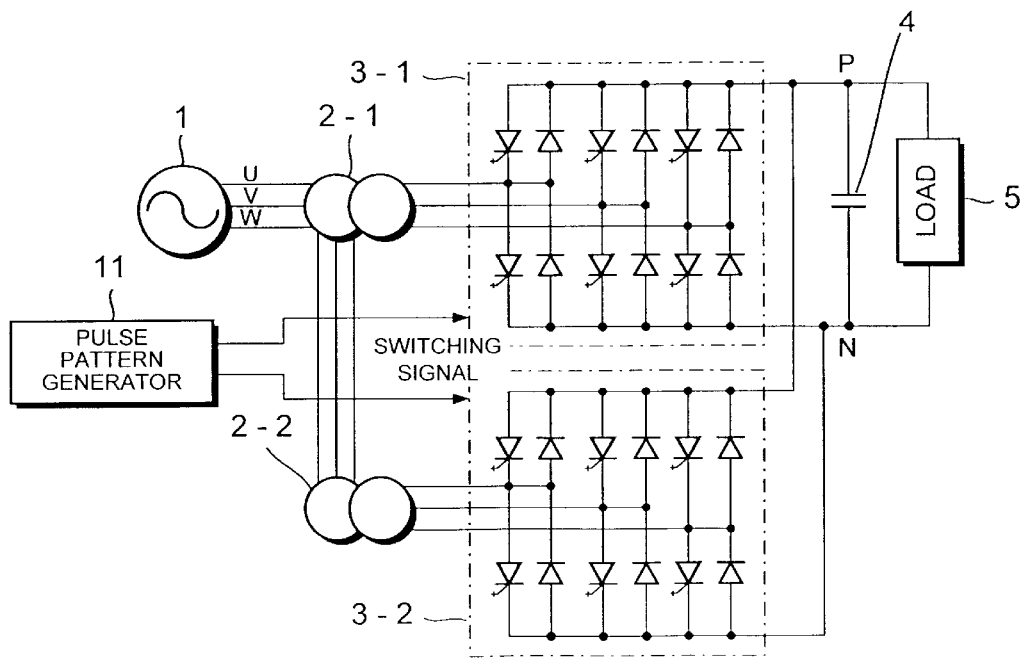
FIG. 6 is a layout diagram illustrating a third embodiment of the present invention.

As shown in FIG. 6, this embodiment differs from the first embodiment in that the smoothing capacitors 4 are common for the self-excited voltage converters.

With this embodiment, just as in the first embodiment, the harmonic components contained in the AC input current waveform can be reduced without raising the switching frequency.

Fourth Embodiment

A fourth embodiment of the present invention is described below with reference to the drawings.

Figure 7:
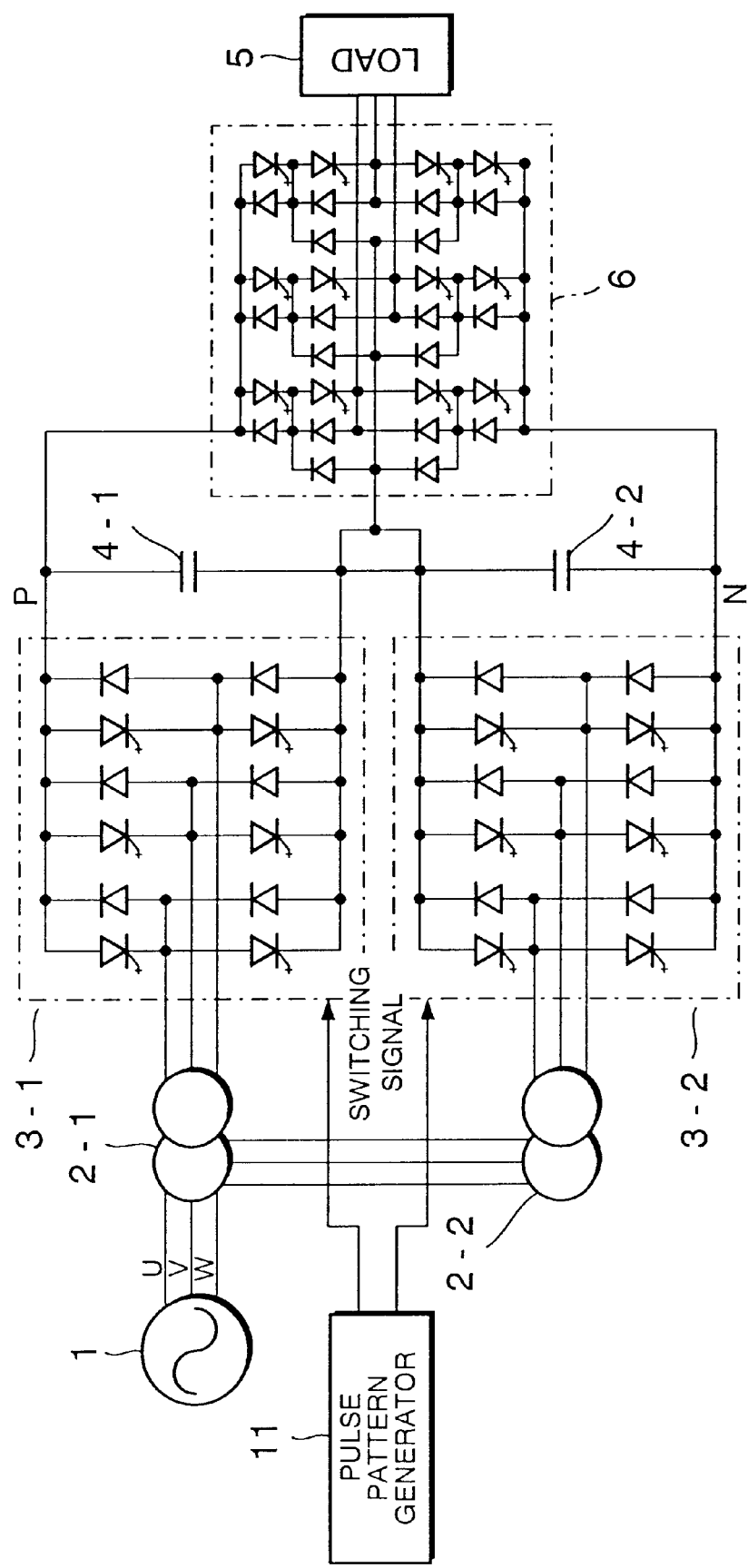
FIG. 7 is a layout diagram illustrating a fourth embodiment of the present invention.

As shown in FIG. 7, in this embodiment, the multi-connection number is taken as n=2 and a three-level voltage inverter (NPC inverter) is connected as the load. This can also be applied to be inverters of more levels by increasing the multi-connection number.

Fifth Embodiment

A fifth embodiment of the present invention is described below with reference to the drawings.

Figure 8:
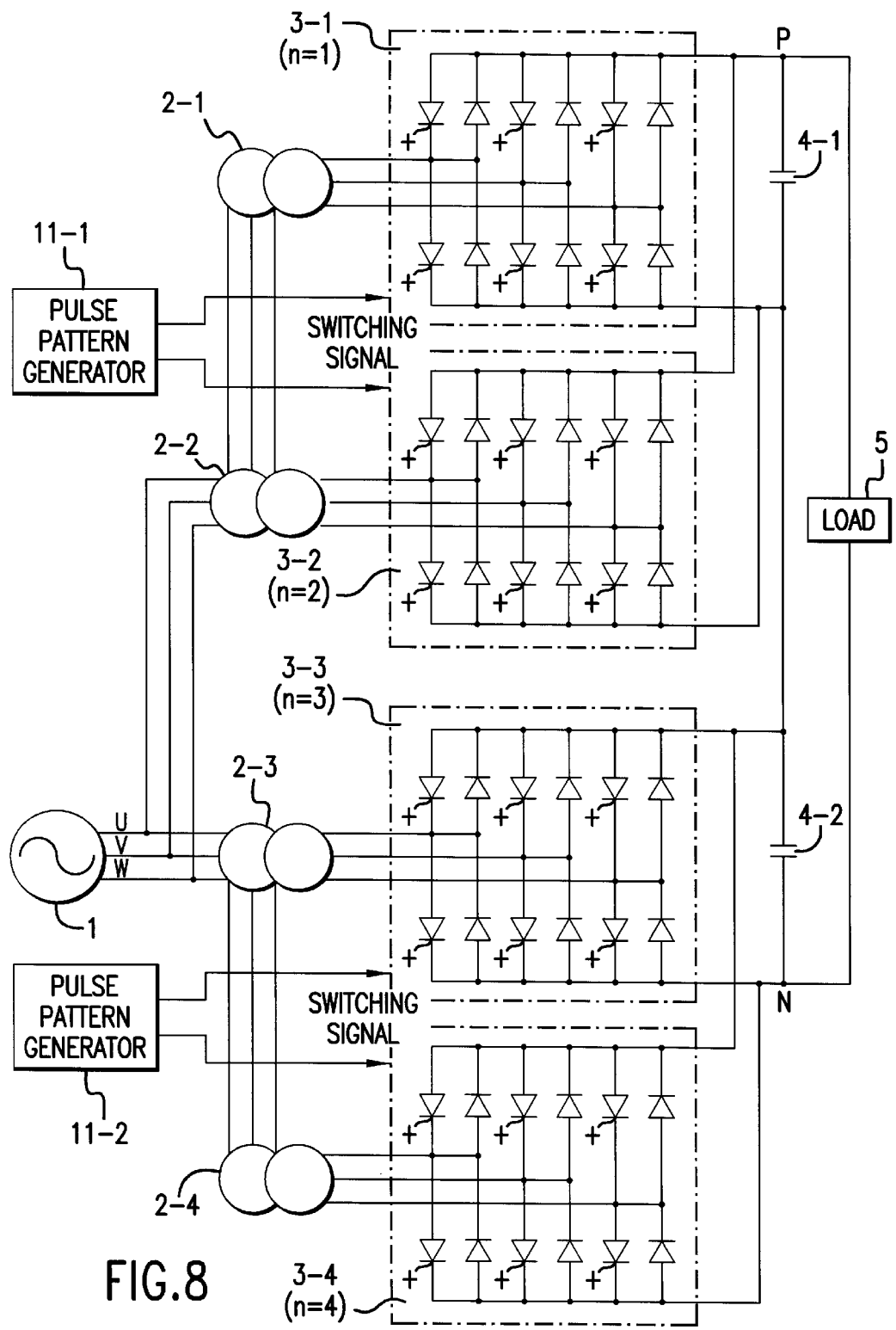
FIG. 8 is a layout diagram illustrating a fifth embodiment of the present invention.

As shown in FIG. 8, in this embodiment, the capacity of the power conversion device can be expanded by connecting a power conversion device of multi-connection number n=2 in parallel with the AC power source, connecting a smoothing capacitor in series with the DC side, and supplying DC power to the load.

Sixth Embodiment

A sixth embodiment of the present invention is described below with reference to the drawings.

Figure 9:
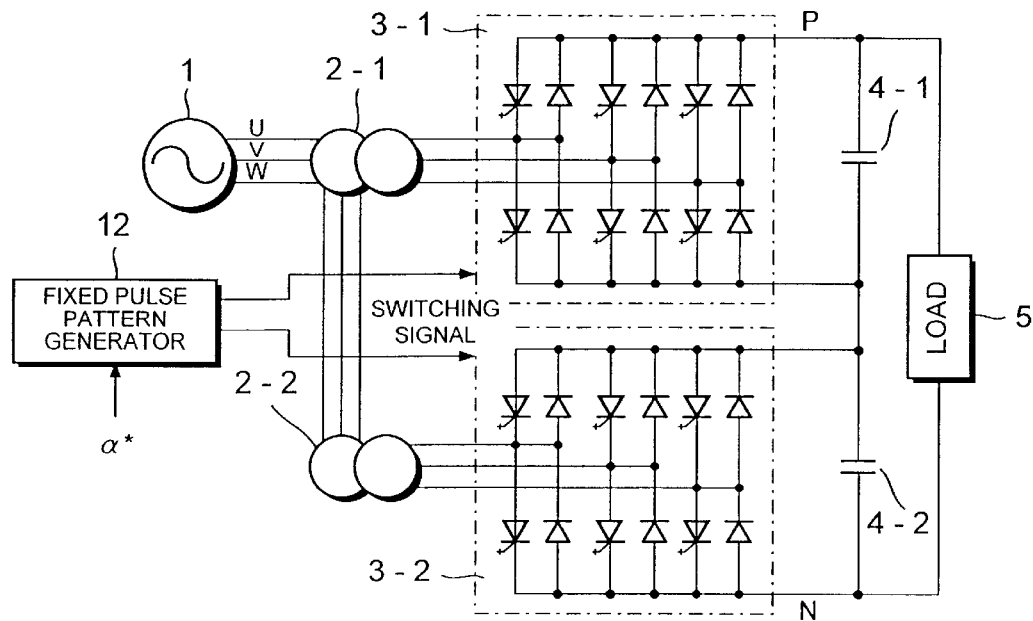
FIG. 9 is a layout diagram illustrating a sixth embodiment of the present invention.

As shown in FIG. 9, this embodiment differs from the first embodiment in that the pulse pattern generator is a fixed pulse pattern generator 12.

Consequently, in this embodiment, the fixed pulse pattern generator 12 generates a fixed pulse pattern synchronized with the AC power source in accordance with an arbitrary phase angle reference value a* with respect to the AC power source voltage. In this case, a specific harmonic component contained in the AC input current waveform can be suppressed to a desired value by selecting an pattern such that the specific harmonic component contained in the fixed pulse pattern has the desired value.

Seventh Embodiment

A seventh embodiment of the present invention is described below with reference to the drawings.

Figure 10:
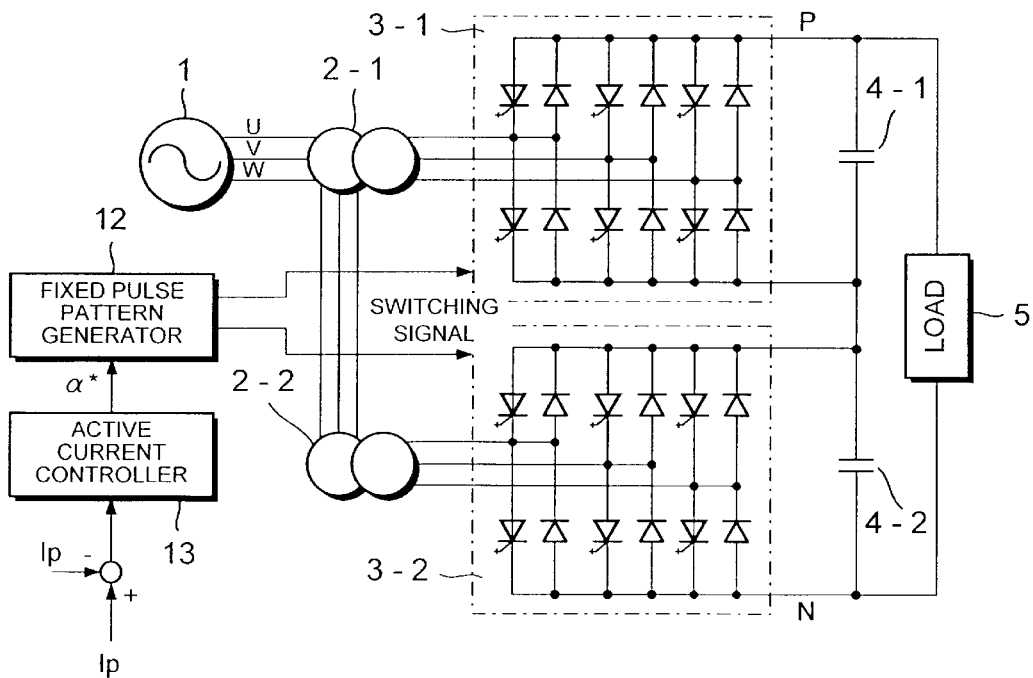
FIG. 10 is a layout diagram illustrating a seventh embodiment of the present invention.

As shown in FIG. 10, in this embodiment, active current controller 13 finds and outputs the phase angle reference value a* of the fixed pulse pattern generated by fixed pulse pattern generator 12 with respect to the AC power source voltage by performing proportional integral control based on the deviation of the active current value Ip supplied to the power conversion device from the AC power source and an active current reference value Ip*.

Next, the control action of this embodiment will be described with reference to FIG. 11.

Figure 11:
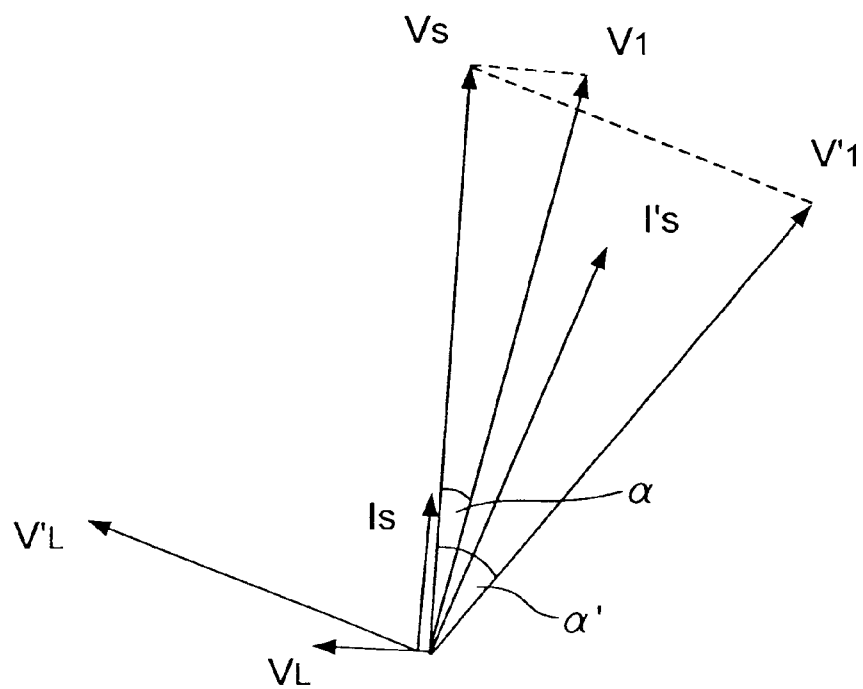
FIG. 11 is a voltage-current vector diagram given in explanation of the principles of operation of the seventh embodiment of the present invention illustrated in FIG. 10.

FIG. 11 shows a voltage-current vector diagram at a given instant, V1 being the primary voltage vector (current converter AC side voltage) determined by the fundamental component of the fixed pulse pattern, Is being the AC input current vector, Vs being the AC power source voltage vector, and $V_L$ being the voltage vector that is applied to the reactor arranged on the AC side of the power conversion device or the AC system inductance Ls. The voltage vectors satisfy the following expression:

$$V_L = Vs - V1 \quad (1)$$

And the AC input current vector Is is given by the following expression:

$$Is = V_L/j\omega_s Ls \quad (2)$$

where $\omega_S$ is the AC power source frequency.

From this condition, considering the case where the phase angle of the fixed pulse pattern supplied to the power conversion device with respect to the AC power source voltage is increased from a to a', the voltage vector that is applied to inductance Ls is in accordance with the following expression:

$$V'_L = VS - V'1 \quad (3)$$

And the AC input current vector is in accordance with the following expression:

$$I'_S = V'_L/j\omega_s Ls \quad (4)$$

From the above, by increasing the phase angle of the fixed pulse pattern with respect to the AC power source voltage, the AC input current is increased, and the active 10 current component contained therein is also increased.

Contrariwise, by decreasing the phase angle, the active current component can also be decreased.

With this embodiment, even if the switching signal that is supplied to the self-excited voltage converter is a fixed pulse pattern, by changing the phase angle thereof with respect to the AC power source voltage, the active current supplied to the power conversion device from the AC power source can be controlled to a desired value.

Eighth Embodiment

An eighth embodiment of the present invention is described below with reference to the drawings.

Figure 12:
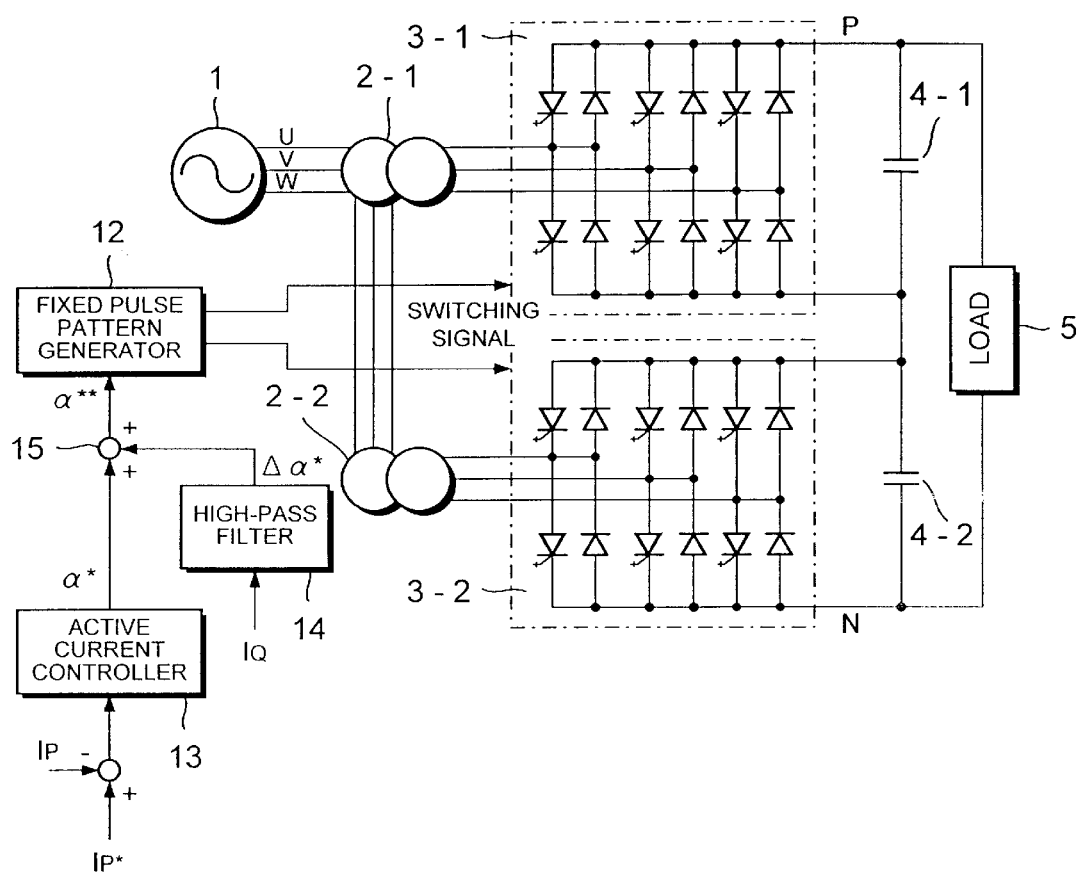
FIG. 12 is a layout diagram illustrating an eighth embodiment of the present invention.

As shown in FIG. 12, in this embodiment, high-pass filter 14 removes the DC component from the reactive current value IQ that is supplied to the power conversion device from the AC power source, thereby detecting the oscillating component contained in the reactive current; the phase angle reference compensation value Δα* is found by multiplying this by a suitable coefficient and is output.

Adder 15 adds the phase angle reference compensation value Δα* and the phase angle reference value α* and outputs a corrected phase angle reference value a**. In this embodiment, if the active current supplied to the power conversion device from the AC power source is controlled by changing the phase angle of the fixed pulse pattern, oscillation of the active current can be suppressed.

Ninth Embodiment

A ninth embodiment of the present invention is described below with reference to the drawings.

Figure 13:
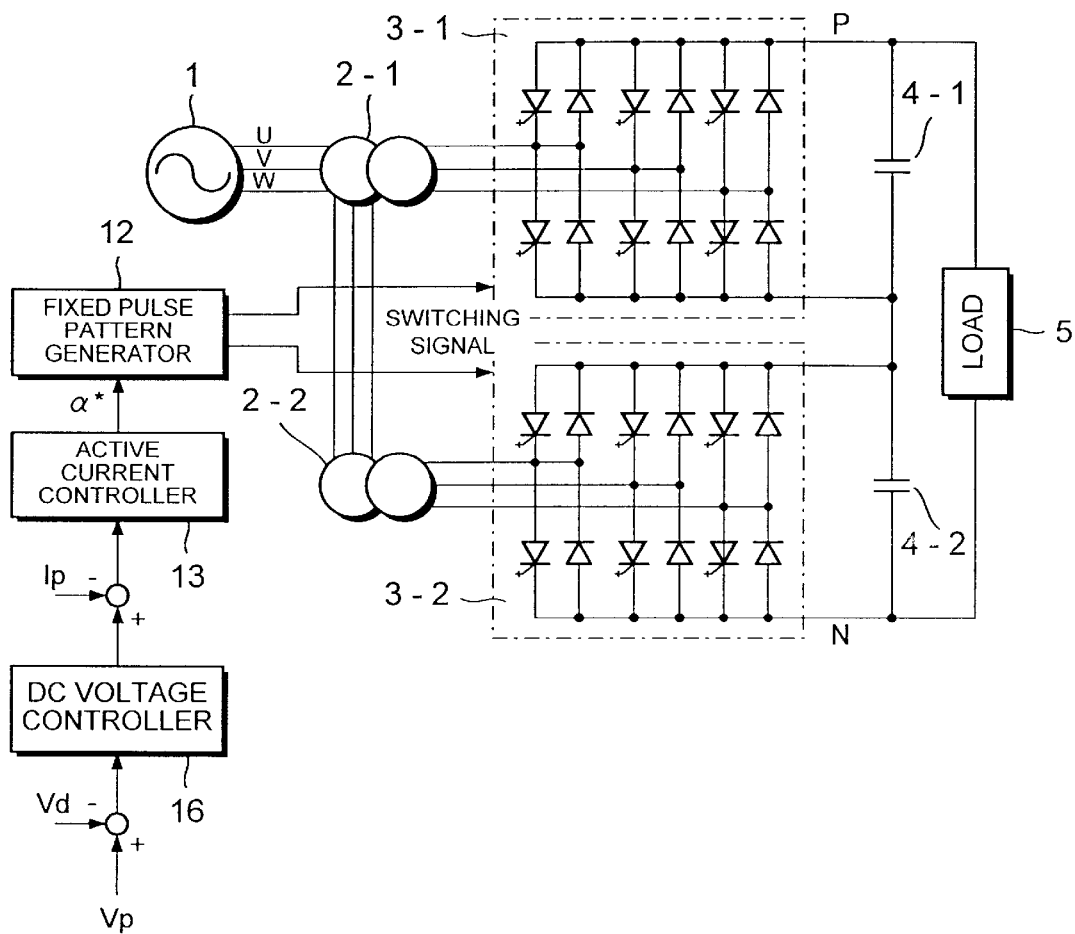
FIG. 13 is a layout diagram illustrating a ninth embodiment of the present invention.

As shown in FIG. 13, in this embodiment, DC voltage controller 16 performs proportional integral control based on the deviation of the DC voltage Vd which is the DC side voltage of the power conversion device and the DC voltage reference value Vd*, thereby finding an active current reference value Ip*, which is output.

Consequently, with this embodiment, the DC side voltage of the power conversion device can be controlled to a desired value.

Tenth Embodiment

A tenth embodiment of the present invention is described below with reference to the drawings.

Figure 14:
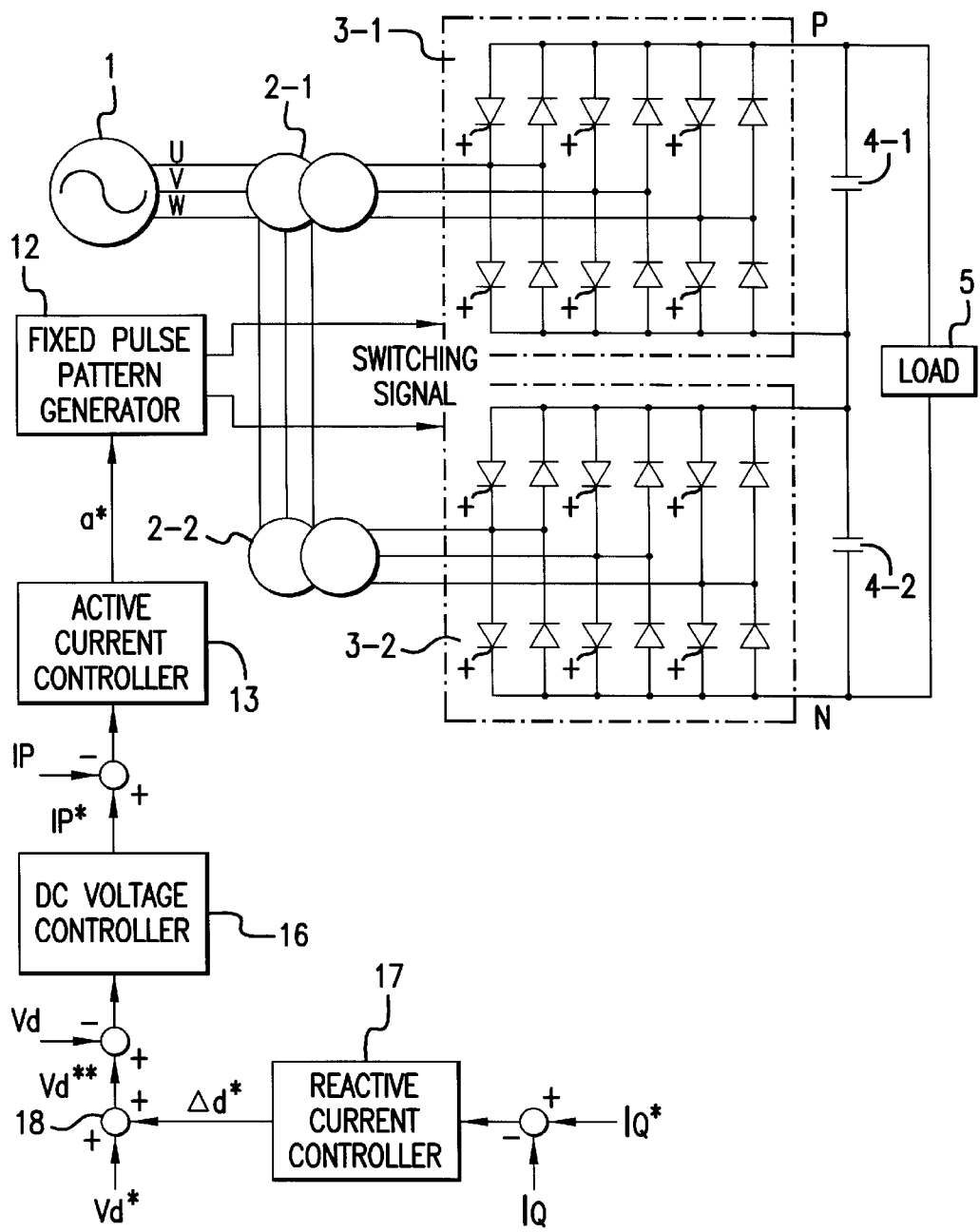
FIG. 14 is a layout diagram illustrating a tenth embodiment of the present invention.

As shown in FIG. 14, in this embodiment, reactive current controller 17 performs proportional integral control based on the deviation between the reactive current value IQ supplied to the power conversion device from the AC power source and the reactive current reference value IQ*, thereby finding a DC voltage reference compensation value ΔVd*, which is output. Adder 18 adds the DC voltage reference compensation value ΔVd* and the DC Voltage reference value Vd* to obtain a corrected DC voltage reference value Vd**, which is output.

Consequently, with this embodiment, the reactive current supplied to the power conversion device from the AC power source can be controlled to a desired value; in particular, the AC power source power factor can be controlled to 1 when the reactive current reference value IQ*=0.

Eleventh Embodiment

Figure 15:
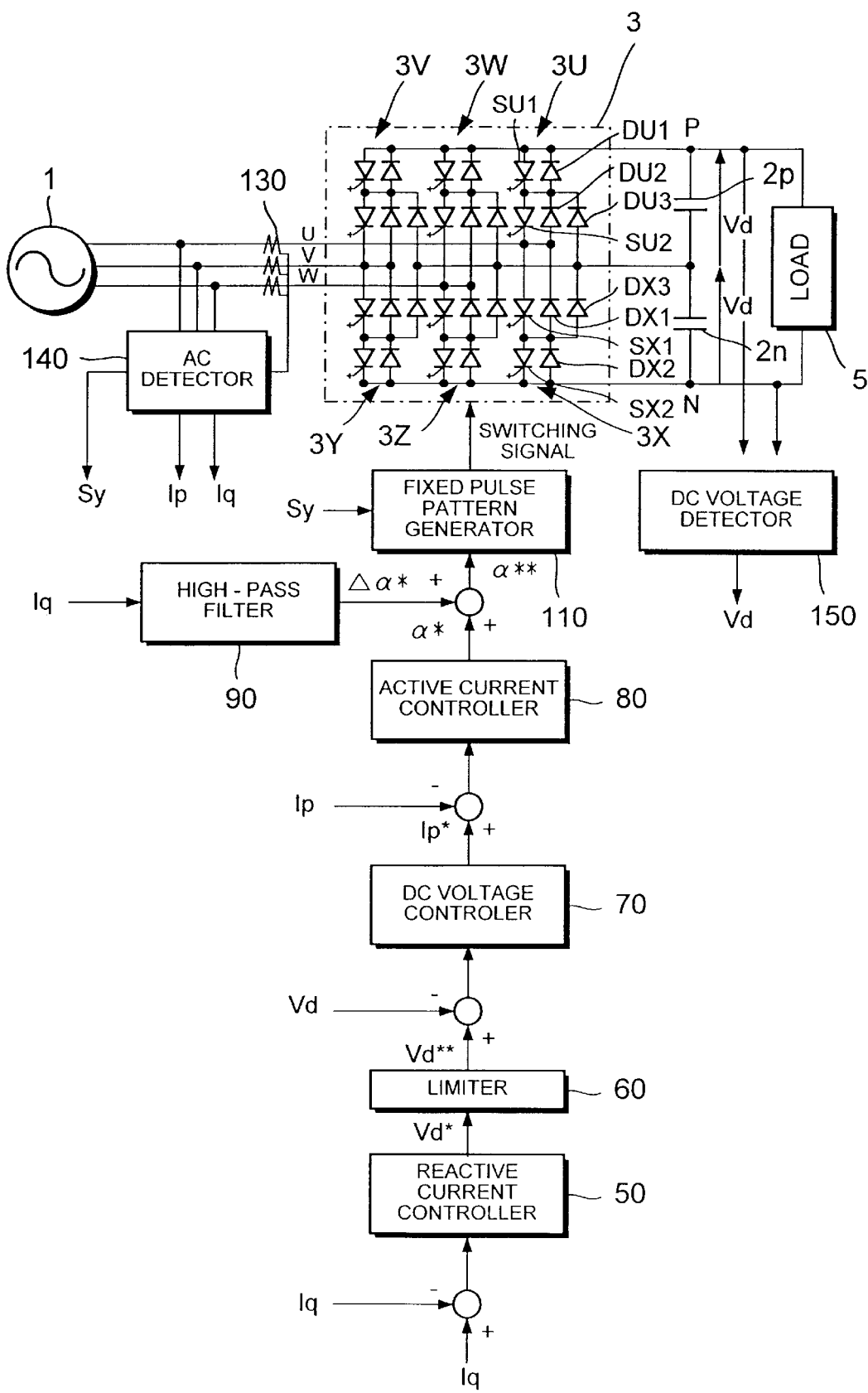
FIG. 15 is a layout diagram illustrating an eleventh embodiment of a power conversion device according to the invention of the present application.

FIG. 15 is a block diagram illustrating an eleventh embodiment of the power conversion device according to the invention of the present application. The characteristic features of the apparatus shown in FIG. 15 lie in the internal construction of the PWM controller 10 of FIG. 1, which comprises a reactive current controller 50, limiter 60, DC voltage controller 70, active current controller 80, high-pass filter 90, adder 100, and fixed pulse pattern generator 110.

In FIG. 15, an NPC (neutral point clamped) power conversion device 3 is illustrated as an example of a self-excited voltage power conversion device, but any self-excited voltage power conversion device could be employed, there being no particular restriction as to type. Load 5 is connected to the DC side terminal of the self-excited voltage power conversion device 3, and may be for example a voltage inverter.

In the power conversion device of FIG. 15, a current detector 130 and AC detector 140 are provided on the AC side and a DC voltage detector 150 is provided on the DC side as means for detecting feedback values for control purposes. Current detector 130 detects the AC current supplied from AC power source 1 to power conversion device 3; AC detector 140 calculates the active current Ip and reactive current Iq supplied from AC power source 1 to power conversion device 3 using the AC current detected by current detector 130 and the input voltage of power conversion device 3, and generates synchronization signal Sy synchronized with the AC voltage. Active current Ip is supplied as a feedback current value to the input stage of active current controller 80 and likewise reactive current Iq is supplied to the input stage of reactive current controller 50 and high-pass filter 90. The DC side voltage Vd is detected by DC voltage detector 150 and this is supplied as a feedback DC voltage value to the input stage of DC voltage controller 70.

Reactive current controller 50 inputs the deviation of the reactive current Iq supplied from the AC power source 1 to the power conversion device with respect to the reactive current reference value Iq*, and performs control calculation such as proportional integral control, and outputs a DC voltage reference value Vd* such as to make this deviation zero. This DC voltage reference value Vd is restricted so that it does not exceed a prescribed amplitude range by passing it through a limiter 60 and is output as a new DC voltage reference value Vd. By comparing the DC side voltage Vd of the power conversion device with the DC voltage reference value Vd**, DC voltage controller 70 generates an active current reference value Ip* such as to make the deviation of these two zero. Active current controller 80 performs control calculations such as proportional integral control using the deviation of the active current Ip supplied from the AC power source 1 to the power conversion device with respect to the active current reference value Ip*, and thereby finds and outputs a phase angle reference value α* corresponding to the ON/OFF phase of the switching devices of power conversion device 3.

High-pass filter 90 removes the DC component from the reactive current Iq supplied from the AC power source to the power conversion device and thereby detects the oscillation component contained in this reactive current and, by multiplying this by a suitable coefficient, finds phase angle reference compensation value Δα*; adder 100 adds this to the phase angle reference value α* from the active current controller 80 to find the compensated phase angle reference value α. Fixed pulse pattern generator 110 generates a fixed pulse pattern for controlling power conversion device 3 in accordance with the phase angle reference value α that is finally obtained. Power conversion device 3 is controlled by fixed pulse pattern generator 110 generating a fixed pulse pattern of ON/OFF phase whose fundamental frequency is synchronized with the AC power source frequency as switching signal supplied to power conversion device 3, in accordance with the phase angle reference value α** with respect to the AC power source voltage phase.

Figure 16:
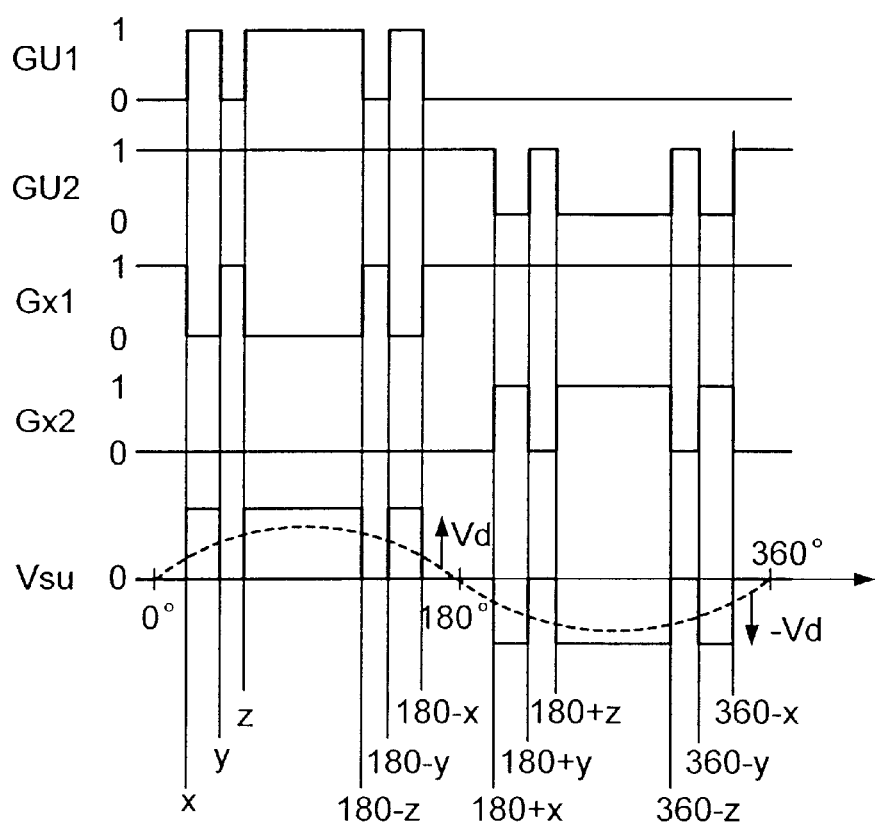
FIG. 16 is a waveform diagram illustrating an example of a fixed pulse pattern in the apparatus of FIG. 15.

As an example of the fixed pulse pattern generated by fixed pulse pattern in generator 110, FIG. 16 shows the switching signals GU1, GU2, GX1, GX2 supplied to the U-phase switching devices SU1, SU2, SX1, SX2 in self-excited voltage power conversion device 3, and the AC side U-phase voltage waveform Vsu of self-excited voltage power conversion device 3. It is to be assumed that when a switching signal is "1", the corresponding switching element is in the ON condition and when it is "0" it is in the OFF condition. The voltages of the smoothing capacitors 2p and 2n are respectively taken as Vd. Consequently, the voltage between the DC terminals P and N is 2 Vd.

In FIG. 16, the number of pulses per AC power source half-cycle of the fixed pulse pattern is 3 and the ON/OFF fundamental phase angle of the fixed pulse pattern is defined by the phase angles x (ON), y (OFF), z (ON) of first four half-cycles. These phase angles are:

$$0° < x < y < z < 90° \tag{5}$$

Taking into account the symmetry of the waveform, the OFF/NO/OFF phase angles of the second four half-cycles are determined as:

$$180-z, 180-y, 180-x \tag{6}$$

likewise the OFF/ON/OFF phase angles of the third four half-cycles are determined as:

$$180+x, 180+y, 180+z \tag{7}$$

and the OFF/ON/OFF phase angles of the fourth four half-cycles are determined as:

$$360-z, 360-y, 360-x \tag{8}$$

The harmonic components contained in the AC side U-phase voltage Vsu of the power conversion device 3 can be calculated by Fourier expansion of the AC side U-phase voltage Vsu of FIG. 16. By Fourier expansion, the n-th order harmonic component Vn contained in the AC side U-phase voltage Vsu of power conversion device 3 is calculated as follows.

$$Vn = 4 \, Vd\{\cos(nx) - \cos(ny) + \cos(nz)\}/(nn) \tag{9}$$

where n=1, 3, 5, 7, 9, 11 . . . .

If no harmonic constituents are present in the AC power source voltage, the harmonic constituents contained in the AC input current of the power conversion device 3 are determined by the harmonic constituents contained in the converter AC side voltage. Consequently, by suitably selecting the phase angles x, y, z so as to reduce the harmonic components contained in the converter AC side voltage, the amount of harmonic constituents contained in the AC input current can be reduced without increasing the switching frequency.

It should be noted that, although in FIG. 16 as an example of the fixed pulse pattern the case of three pulses per AC power source half cycle was illustrated, the number of pulses can be selected at will.

The control action of the active current controller 80 is illustrated with reference to FIG. 17. FIG. 18 shows a voltage-current vector diagram at a given instant, Va being the power conversion device AC side voltage level determined by the DC side voltage Vd of the power conversion device and the fundamental component of the fixed pulse pattern, Is being the AC input current vector, Vs being the AC power source voltage vector, $V_L$ being the voltage vector applied to a reactor arranged on the AC side of the power conversion device or to the AC system inductance Ls. Each voltage vector satisfies the following expression (the vector symbol is omitted, here and hereinbelow).

$$V_L = VS - Va \quad (10)$$

Also, the AC input current vector Is is given by the following expression:

$$Is = V_L/(j\omega S \cdot LS) \quad (11)$$

where ωS is the AC power source frequency.

Considering the case where, from this condition, the phase angle in the lagging direction with respect to the AC power source voltage of the fixed pulse pattern applied to the power conversion device is increased from α to α', expression (10) changes to the following expression by change of the voltage level that is applied to inductance Ls to $V'_L$ and the voltage level Va to V'a.

$$V'_L = VS - V'a \quad (12)$$

Also, the expression for the AC input current vector becomes the following:

$$I'S = V'_L/(j\omega S \cdot LS) \quad (13)$$

Consequently, by increasing the phase angle of the fixed pulse pattern in the lagging direction with respect to the AC power source voltage, the AC input current Is is increased and the active current Ip component contained therein is also increased. Contrariwise, by decreasing the phase angle in the lagging direction, the active current Ip component can also be decreased. Furthermore, by controlling the phase angle in the leading direction, regeneration of the DC power on the AC side can also be achieved.

With this embodiment, even when the switching signal that is applied to self-excited voltage power conversion device 3 is a fixed pulse pattern, the active current Ip that is supplied from AC power source 1 to the power conversion device can be controlled to a desired value by altering the phase angle with respect to this AC power source voltage.

As already described, high-pass filter 90 removes the DC component from the reactive current Iq supplied from AC power source 1 to the power conversion device and thereby detects the oscillation component contained in the reactive current Iq and, by multiplying this by a suitable coefficient, finds a phase angle reference compensation value Δα*, which it outputs. This phase angle reference compensation value Δα* is added to the phase angle reference value α* to obtain a corrected phase angle reference value α. Fixed pulse pattern generator 110 generates a fixed pulse pattern in accordance with the corrected phase angle reference value α.

Thus, thanks to the provision of high-pass filter 90, oscillation of the active current Ip can be controlled if the active current Ip that is supplied from the AC power source 1 to the power conversion device is controlled by changing the phase angle of a fixed pulse pattern.

However, if there is no need to suppress oscillation of the active current supplied from the AC power source to the power conversion device, high-pass filter 90 and adder 100 can be dispensed with.

DC voltage controller 70 calculates the active current reference value Ip* using the deviation of the DC side voltage Vd of the power conversion device and the DC voltage reference value Vd, and transmits this to active current controller 80. Active current controller 80** increases or reduces the DC side voltage Vd of the power conversion device by controlling the active current Ip that is supplied from the AC power source to the power conversion device in accordance with the active current reference value Ip*.

Thus, by providing a DC voltage controller 70, the DC side voltage Vd of the power conversion device can be controlled to a desired value.

If there is no need to control the DC side voltage Vd of the power conversion device to a desired value, DC voltage controller 70 can be dispensed with.

Reactive current controller 50 finds the DC voltage reference value Vd* using the deviation of the reactive current Iq supplied from the AC power source 1 to the power conversion device and the reactive current reference value Iq*, and transmits this to DC voltage controller 70. DC voltage controller 70 increases or decreases the absolute value of the power conversion device AC side voltage vector Va determined by the DC side voltage Vd and the fundamental component of the fixed pulse pattern by controlling the DC side voltage Vd of the power conversion device in accordance with the DC voltage reference value Vd*.

Figure 17:
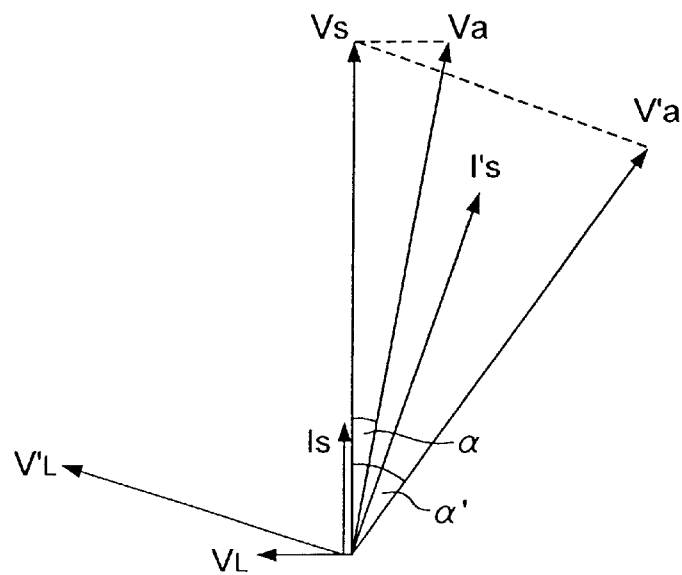
FIG. 17 is a voltage-current vector diagram given in explanation of the principles of operation of an active current controller in the apparatus of FIG. 15.
Figure 18:
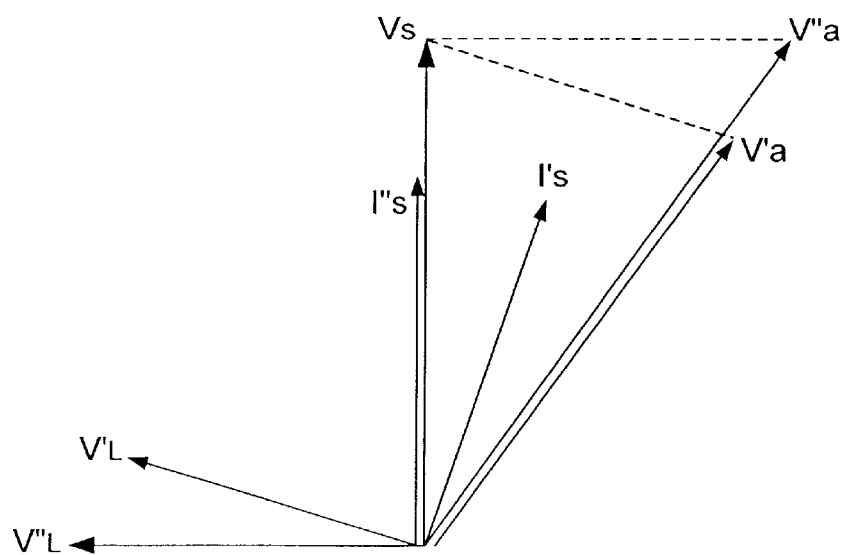
FIG. 18 is a voltage-current vector diagram given in explanation of the principles of operation of a reactive current controller in the apparatus of FIG. 15.

FIG. 18 is a voltage-current vector diagram at a given instant similar to FIG. 17 and describes as an example the principle of controlling the reactive current Iq to zero by increasing the AC side voltage vector V'a of the power conversion device to V"a in other words the principle of making Iq=0 by making the AC input current vector I's an AC input current vector I"s of the same phase as AC power source voltage Vs.

Thus, by providing a reactive current controller 5, the reactive current Iq that is supplied from the AC power source 1 to the power conversion device can be controlled to a desired value: in particular, if the reactive current reference value Iq*=0, it is possible to control the AC power source power factor to 1.

If it is not necessary to control the reactive current Iq supplied from the AC power source to the power conversion device to a desired value, reactive current controller 50 can be dispensed with.

Limiter 60 transmits to DC voltage controller 70 a new DC voltage reference value Vd obtained by restricting the DC voltage reference value Vd that is output by reactive current controller 100 such that it does not exceed an arbitrarily specified range. DC voltage controller 70 controls the DC side voltage Vd of the power conversion device in accordance with DC voltage reference value Vd**.

With this embodiment, the DC side voltage Vd (or 2 Vd) of the power conversion device can be controlled to within a desired range.

If there is no need to control the DC side voltage of the power conversion device to within a desired range, limiter 60 may be dispensed with.

Although in the embodiments described above, the individual functional components were described as consisting of a plurality of discrete components, these components could be implemented by software using one or more microprocessors.

With a power conversion device according to the invention of the present application, the amount of harmonic components contained in the AC input current can be reduced without increasing the switching frequency, making it possible to achieve both an improvement in power conversion efficiency and reduction in power source harmonics.

Furthermore, according to the invention of the present application, DC voltage divided in multiple steps could be applied as the DC power source of a multi-level voltage inverter that converts this into AC voltage.

Furthermore, according to the invention of the present application, the capacity of a power conversion device could be expanded by connecting a plurality of power conversion devices in parallel with an AC power source, and supplying DC power to a common load.

Furthermore, according to the invention of the present application, by making the pulse pattern of the switching signal that is supplied to each of the self-excited voltage type converters a fixed pulse pattern, it becomes possible to select a pulse pattern such as to reduce the amount of harmonic components and so to improve the harmonic reduction effect.

Furthermore, according to the invention of the present application, the active current that is supplied to the power conversion device from the AC power source can be prevented from becoming oscillatory, and can be controlled in stable fashion.

Furthermore, according to the invention of the present application, the DC side voltage of the power conversion device can be controlled to a desired value.

Furthermore, according to the invention of the present application, the reactive current that is supplied from the AC power source to the power conversion device can be controlled to a desired value.

Furthermore, according to the invention of the present application, the active current that is supplied from the AC power source to the power conversion device can be prevented from becoming oscillatory, thereby enabling stable control to be achieved.

Furthermore, according to the invention of the present application, the DC side voltage of the power conversion device can be controlled to a desired value.

Furthermore, according to the invention of the present application, the reactive current that is supplied from the AC power source to the power conversion device can be controlled to a desired value.

Furthermore, according to the invention of the present application, the DC side voltage of the power conversion device can be restricted to within a desired range.

Thus, although the present invention has been shown and described with respect to exemplary embodiments thereof, it should be understood by those skilled in the art that the foregoing and various other changes, omissions and additions may be made therein and thereto, without departing from the spirit and scope of the present invention.

What is claimed is:

1. A PWM controlled power conversion device that performs power conversion using self-excited voltage power converters whose primary sides are connected to an AC power source and whose secondary sides have smoothing capacitors, comprising:

an active current control unit for calculating a phase angle reference value for determining an ON/OFF phase based on said AC power source voltage phase, from a deviation of an active current input to said power conversion device with respect to an active current reference value; and a fixed pulse pattern generating unit for controlling said self-excited voltage power converters by generating switching signals of fixed pulse pattern whose fundamental frequency is synchronized with an AC power source frequency, based on said phase angle reference value calculated by said active current control unit.

2. The PWM controlled power conversion device according to claim 1, wherein said active current control unit performs proportional integral control for calculating the phase angle reference value.

3. The PWM controlled power conversion device according to claim 1, further comprising:

a high-pass filter for outputting a phase angle reference compensation value based on an oscillation component contained in a reactive current supplied from said AC power source to said power conversion device; and an addition unit for adding said phase angle reference compensation value output from said high-pass filter to said phase angle reference value that is output from said active current control unit.

4. The PWM controlled power conversion device according to claim 3, wherein said high-pass filter removes a DC component from the reactive current in order to obtain the oscillation component.

5. The PWM controlled power conversion device according to claim 4, wherein said high-pass filter multiplies the oscillation components by a predetermined coefficient, when computing the phase angle reference compensation value.

6. The PWM controlled power conversion device according to claim 3, further comprising:

a DC voltage control unit for calculating said active current reference value from a deviation between a DC side voltage of said self-excited voltage power converter and a DC voltage reference value.

7. The PWM controlled power conversion device according to claim 1, further comprising:

a DC voltage control unit for calculating said active current reference value from a deviation between a DC side voltage of said self-excited voltage power converter and a DC voltage reference value.

8. The PWM controlled power conversion device according to claim 7, further comprising:

a reactive current control unit for calculating said DC voltage reference value from a deviation between a reactive current supplied from said AC power source to said power conversion device and a reactive current reference value.

9. The PWM controlled power conversion device according to claim 8, further comprising:

a limiter for restricting said DC voltage reference value that is output from said reactive current control unit not so as to exceed a desired range.

10. The PWM controlled power conversion device according to claim 9, wherein said limiter outputs a limited DC voltage reference value that is utilized by said DC voltage control unit in calculating said active current reference value.

11. A PWM controlled power conversion device, comprising:

n transformers having primary sides connected in series with an AC power source and secondary sides connected to a load, phases of secondary side voltages being shifted in each case by 60°/n;

n self-excited voltage converters with AC sides of said converter, connected to said secondary sides of said transformers; and a pulse pattern generator that generates pulses constituting pulse patterns wherein a phase of switching signals supplied to said respective self-excited voltage converters is shifted by 60°/n in each case but that are otherwise identical.

12. The PWM controlled power conversion device according to claim 11, wherein said power conversion device has a plurality of power conversion devices, said power conversion devices are connected in parallel with said AC power source, so as to supply DC power to a common load.

13. The PWM controlled power conversion device according to claim 11, wherein said load is a multi-level voltage inverter that converts DC voltage divided into multiple levels into AC voltage.

14. The PWM controlled power conversion device according to claim 13, wherein said power conversion device has a plurality of power conversion devices, said power conversion devices are connected in parallel with said AC power source, so as to supply DC power to a common load.

* * * * *